(12) United States Patent
Nguyen et al.

(10) Patent No.: US 11,442,188 B2
(45) Date of Patent: Sep. 13, 2022

(54) DIP DETECTION IN LOGGING IMAGE PROCESSING

(71) Applicant: Halliburton Energy Services, Inc., Houston, TX (US)

(72) Inventors: Nam Nguyen, Singapore (SG); David Orlando Torres, Bastrop, TX (US); Gary Wayne Kainer, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 455 days.

(21) Appl. No.: 16/488,676

(22) PCT Filed: Mar. 28, 2019

(86) PCT No.: PCT/US2019/024654
§ 371 (c)(1),
(2) Date: Aug. 26, 2019

(87) PCT Pub. No.: WO2019/191476
PCT Pub. Date: Oct. 3, 2019

(65) Prior Publication Data
US 2021/0356615 A1    Nov. 18, 2021

Related U.S. Application Data

(60) Provisional application No. 62/650,647, filed on Mar. 30, 2018.

(51) Int. Cl.
*G06K 9/00* (2022.01)
*G01V 1/34* (2006.01)
*G06T 3/40* (2006.01)

(52) U.S. Cl.
CPC ......... *G01V 1/345* (2013.01); *G06K 9/00503* (2013.01); *G06K 9/00543* (2013.01); *G06T 3/4007* (2013.01); *G01V 2210/74* (2013.01)

(58) Field of Classification Search
CPC ...... G01V 1/345; G01V 2210/74; G01V 3/24; G06K 9/00503; G06K 9/00543; G06T 3/4007
See application file for complete search history.

(56) References Cited

U.S. PATENT DOCUMENTS 3,060,373 A    10/1962   Henri-Georges
3,132,298 A    5/1964    Henri-Georges et al.
(Continued)

FOREIGN PATENT DOCUMENTS

| CA | 685727 A | 5/1964 |
|---|---|---|
| WO | 2009026979 A1 | 3/2009 |
| WO | 2019177588 A1 | 9/2019 |

OTHER PUBLICATIONS

PCT Application Serial No. PCT/US2019/024654, International Search Report, dated Jul. 9, 2019, 4 pages.
(Continued)

*Primary Examiner* — Avinash Yentrapati
(74) *Attorney, Agent, or Firm* — DeLizio, Peacock, Lewin & Guerra (57) ABSTRACT

A method for imaging a downhole formation. The method includes combining the captured images to generate a partial image of the formation, wherein the partial image includes captured images separated by gaps representing portions of the formation not captured with sensors what were disposed downhole. The method includes locating dips in the formation within the partial image and interpolating the partial image using the located dips within the partial image.

20 Claims, 10 Drawing Sheets

(56) References Cited

U.S. PATENT DOCUMENTS

| | | | |
|---|---|---|---|
| 3,379,963 | A | 4/1968 | Saurenman |
| 3,379,964 | A | 4/1968 | Segesman |
| 3,579,098 | A | 5/1971 | Mougne |
| 4,251,773 | A | 2/1981 | Cailliau et al. |
| 4,468,623 | A | 8/1984 | Gianzero et al. |
| 4,545,242 | A | 10/1985 | Chan |
| 4,567,759 | A | 2/1986 | Ekstrom et al. |
| 4,692,908 | A | 9/1987 | Ekstrom et al. |
| 4,851,781 | A | 7/1989 | Marzetta et al. |
| 4,862,090 | A | 8/1989 | Vannier et al. |
| 5,008,625 | A | 4/1991 | Chen |
| 5,012,193 | A | 4/1991 | Chen |
| 5,038,378 | A | 8/1991 | Chen |
| 5,983,163 | A | 11/1999 | Waid et al. |
| 6,191,588 | B1 | 2/2001 | Chen |
| 6,453,239 | B1 * | 9/2002 | Shirasaka .............. G01C 21/16 701/508 |
| RE42,493 | E | 6/2011 | Tabarovsky |
| 8,579,037 | B2 | 11/2013 | Jacob |
| 9,366,135 | B2 * | 6/2016 | Ye ........................... E21B 49/00 |
| 10,641,922 | B2 * | 5/2020 | He ....................... G01V 11/002 |
| 2009/0259446 | A1 | 10/2009 | Zhang et al. |
| 2011/0064277 | A1 * | 3/2011 | Duncan .................... G01V 3/20 382/109 |
| 2013/0170713 | A1 * | 7/2013 | Kumar .................. G06V 20/00 382/109 |
| 2015/0098627 | A1 * | 4/2015 | Ye ........................... G01V 1/50 382/109 |
| 2018/0031718 | A1 * | 2/2018 | Freitas ..................... G01V 1/44 |
| 2018/0342073 | A1 * | 11/2018 | Matsumura .......... G01N 23/046 |

OTHER PUBLICATIONS

PCT Application Serial No. PCT/US2019/024654, International Written Opinion, dated Jul. 9, 2019, 8 pages.

Ye, "A Robust Automatic Dip Pickering Technique to Improve Geological Interpretation and Post-Drill Formation Evaluation of Azimuthal Wellbore Image Logs", Society of Petroleum Engineers, SPE-175026-MS, 2015, 17 pages.

Ye, et al., "Automatic High Resolution Sedimentary Dip Detection On Borehole Imagery", Society of Petrophysicists and Well-Log Analysts, SPWLA 38th Annual Logging Symposium, Jun. 15-18, Houston, Texas, 1997, 13 pages.

Chen, et al., "A Novel Array Laterlog Method", The Log Analyst, 39(5), Jan. 1, 1998, pp. 23-33.

Davies, et al., "Azimuthal Resistivity Imaging: A New Generation Laterolog", SPE Formation Evaluation, 9(3), Jan. 1, 1994, pp. 165-174.

Guner, et al., "Quantitative Demonstration of a High-Fidelity Oil-Based Mud Resistivity Imager Using a Controlled Experiment", Paper presented at the SPWLA 61st Annual Logging Symposium, Virtual Online Webinar, Jun. 2020. doi: https://doi.org/10.30632/SPWLA-5010, 11 pages.

Safinya, et al., "Improved Formation Imaging With Extended Microelectrical Arrays", Paper presented at the SPE Annual Technical Conference and Exhibition, Dallas, Texas, Oct. 1991. doi: https://doi.org/10.2118/22726-MS, 12 pages.

Smits, et al., "High Resolution From a New Laterolog With Azimuthal Imaging", SPE 30584, SPE Annual Technical Conference and Exhibition, Oct. 22-25, Dallas, Texas, Jan. 1, 1995, pp. 563-576.

Suau, et al., "The Dual Laterolog-Rxo Tool", Fall Meeting of the Society of Petroleum Engineers of AIME, Oct. 8-11, 1972, San Antonio, Texas, 44 pages.

Lavigne, et al., "Strange Invasion Profiles: What Multiarray Induction Logs Can Tell Us About How Oil-Based Mud Affects the Invasion Process and Wellbore Stability", Paper presented at the SPWLA 38th Annual Logging Symposium, Houston, Texas, Jun. 1997., 12 pages.

* cited by examiner

DIP DETECTION IN LOGGING IMAGE PROCESSING

BACKGROUND

Dips are geological bedding surfaces, such as sedimentary beds, fractures, faults, etc., which may or may not be perpendicular to a borehole. Dip information (e.g., azimuthal density images) obtained from well logs can be a useful source for formation evaluation and analysis.

BRIEF DESCRIPTION OF THE DRAWINGS

Embodiments of the disclosure may be better understood by referencing the accompanying drawings.

DETAILED DESCRIPTION

The description that follows includes example systems, methods, techniques, and program flows that embody aspects of the disclosure. However, it is understood that this disclosure may be practiced without these specific details. Additionally, well-known instruction instances, protocols, structures and techniques have not been shown in detail in order not to obfuscate the description.

Many downhole resistivity imaging services make use of a sensor in direct contact with the borehole wall to produce images. An array of these sensors can be placed in a pad. Mandrels with extendable arms are often used downhole to deploy multiple pads that are substantially equally spaced azimuthally around the mandrel. As the pads are extended outward to rest against the borehole wall, a smaller percentage of the total circumference is actually measured, as the outward distance to the wall increases. In the case of a resistivity imaging tool (e.g., an Oil Mud Resistivity Imager (OMRI) tool) with 6 pads, 57% of the borehole is measured in an 8" borehole. The remaining 43% of the image track is blank. Some embodiments provide a method to interpolate the blank pixels in the image track, creating a filled, aesthetically pleasing image that helps visualize bedding features.

Accordingly, various embodiments can provide a 360-degree image of the formation surrounding the borehole by removing blind spots or gaps not captured by the sensors on the pads of the extendible arms of the mandrel. Thus, various embodiments reduce uncertainty of features of the reservoir, thereby allowing for a more accurate and efficient evaluation of the formation and its features. Such embodiments can thus improve the efficiency of hydrocarbon recovery operations. For example, the output from various embodiments can be used for more accurate geosteering of lateral drilling from the borehole for improved hydrocarbon recovery. Obtaining a similar end result using conventional approaches can require exhaustive searching and intensive computation, wasting valuable resources.

In some embodiments, interpolation of logging images is based on the presence of dips that have been identified in the partial sensor image. This image may take the form of an unrolled bed boundary in the borehole that forms a one-cycle sinusoidal pattern (see FIG. 3 described below). Therefore, some embodiments include dip discovery and interpolation between the dips that have been discovered.

In some embodiments, dip discovery is used to identify dips in the sensor image by filtering the peaks that are likely to form dips, grouping those peaks together, and fitting a sinusoidal curve through the peak groups across all sensors. In some embodiments, interpolation between dips extracts sections between two adjacent dips. Individual sections can be stretched into a rectangle by resampling vertical lines. Missing pixels can then be interpolated in the rectangle. The interpolated rectangle can then be squeezed back into the same shape of the extracted section. The full image is formed after repeating interpolation for each section between two adjacent dips, moving along the depth axis of the logging image.

Some embodiments include dip detection to avoid an exhaustive search as implemented in current approaches. By selecting the peaks and grouping these peaks, sinusoid fitting is simplified by directly solving for a least-squares solution rather than exhaustively examining all options to get the best one. Some embodiments include using interpolation between the dips to fill in uncaptured parts of a partial logging image. Such embodiments allow interpolation in blocks to balance the influence of top and bottom dips to pixels in between. In other words, pixels closer to a top dip can follow that dip more closely than a bottom dip, and vice versa. In addition, by doing block interpolation, the background texture can also be interpolated across the gap. Such embodiments can provide a full logging image that includes logging of the formation surrounding a borehole in a full 360-degree view. Additionally, this fully interpolated image can be overlaid with other images (such as a circumferential acoustic scanned image of the borehole on top of OMRI image) in order to align borehole features.

Example Wireline Application

Figure 1:
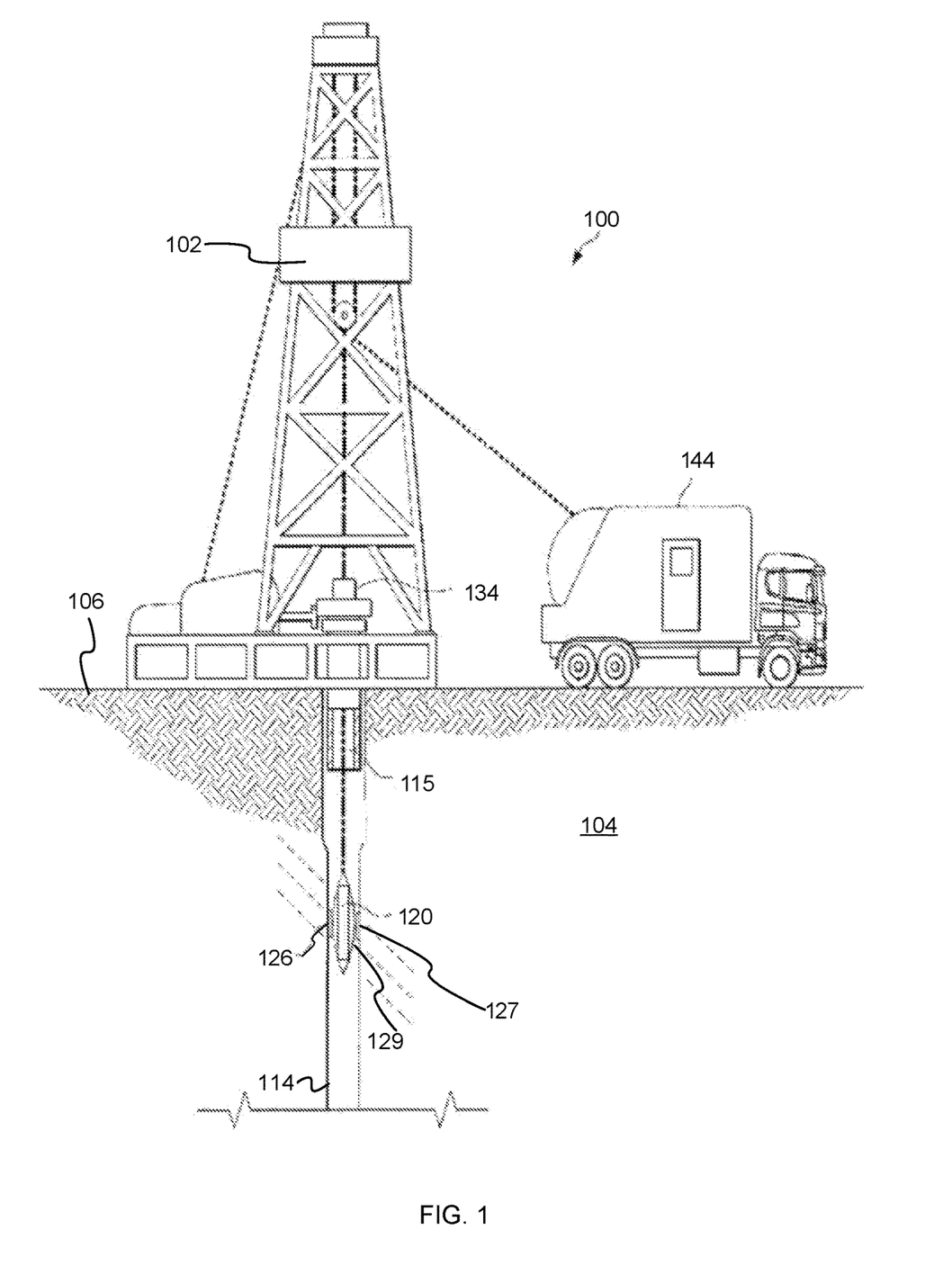
FIG. 1 is a schematic diagram of a wireline system, according to some embodiments.

FIG. 1 is a schematic diagram of a wireline system, according to some embodiments. A wireline system 100 can be used in an illustrative logging environment with a drillstring removed, in accordance with some embodiments of the present disclosure.

Subterranean operations may be conducted using a wireline system 100 once the drillstring has been removed, though, at times, some or all of the drillstring may remain in a borehole 114 during logging with the wireline system 100. A platform 102 is positioned over the borehole 114 in the subterranean formation 104. The wireline system 100 may include one or more logging tools 120 that may be suspended in the borehole 114 by a conveyance 115 (e.g., a cable, slickline, or coiled tubing). The logging tool 120 may be communicatively coupled to the conveyance 115. The conveyance 115 may contain conductors for transporting power to the wireline system 100 and telemetry from the logging tool 120 to a logging facility 144 (shown in FIG. 1 as a truck, although it may be any other structure). Alternatively, the conveyance 115 may lack a conductor, as is often the case using slickline or coiled tubing. The wireline system 100 may contain a control unit 134 that contains memory, one or more batteries, and/or one or more processors for performing any of the operations described below, as well as storing measurements obtained by various sensors attached to the logging tool 120, and other sensors.

In certain embodiments, the control unit 134 can be positioned at the surface 106, in the borehole 114 (e.g., as part of the logging tool 120 and/or in the conveyance 115) or both (e.g., a portion of the processing may occur downhole and a portion may occur at the surface). The control unit 134 may include a control system or a control algorithm. In certain embodiments, a control system, an algorithm, or a set of machine-readable instructions may cause the control unit 134 to generate and provide an input signal to one or more elements of the logging tool 120, such as sensors 126 disposed on the pads 127 and attached to the logging tool 120. The input signal may cause sensors 126 disposed on the pads 127 to be active or to output signals indicative of sensed properties. The logging tool 120 include microresistivity imaging sensors comprising a number of mandrels with extendible arms 129 equipped with sensors 126 where each of the sensors have a surface facing radially outward from the mandrel towards the borehole 114. Each of the pads 127 contains one or more sensors 126, such as resistivity sensors that provide resistivity measurements circumferentially around at least a portion of the borehole 114. During operation, the extendible arms 129 are extended outwards to a wall of the borehole 114 to extend the surface of the pads 127 outward against the wall of the borehole 114. The sensors 126 of the pads 127 of each extendible arm 129 can detect image data to create captured images of the formation surrounding the borehole.

The logging facility 144 may collect measurements from the logging tool 120, and may include computing facilities for controlling, processing, or storing the measurements gathered by the logging tool 120. The computing facilities may be communicatively coupled to the logging tool 120 by way of the conveyance 115 and may operate similarly to the control unit 134. In certain example embodiments, the control unit 134, which may be located in logging tool 120, may perform one or more functions of the computing facility.

Example Logging While Drilling (LWD) Application

Figure 2:
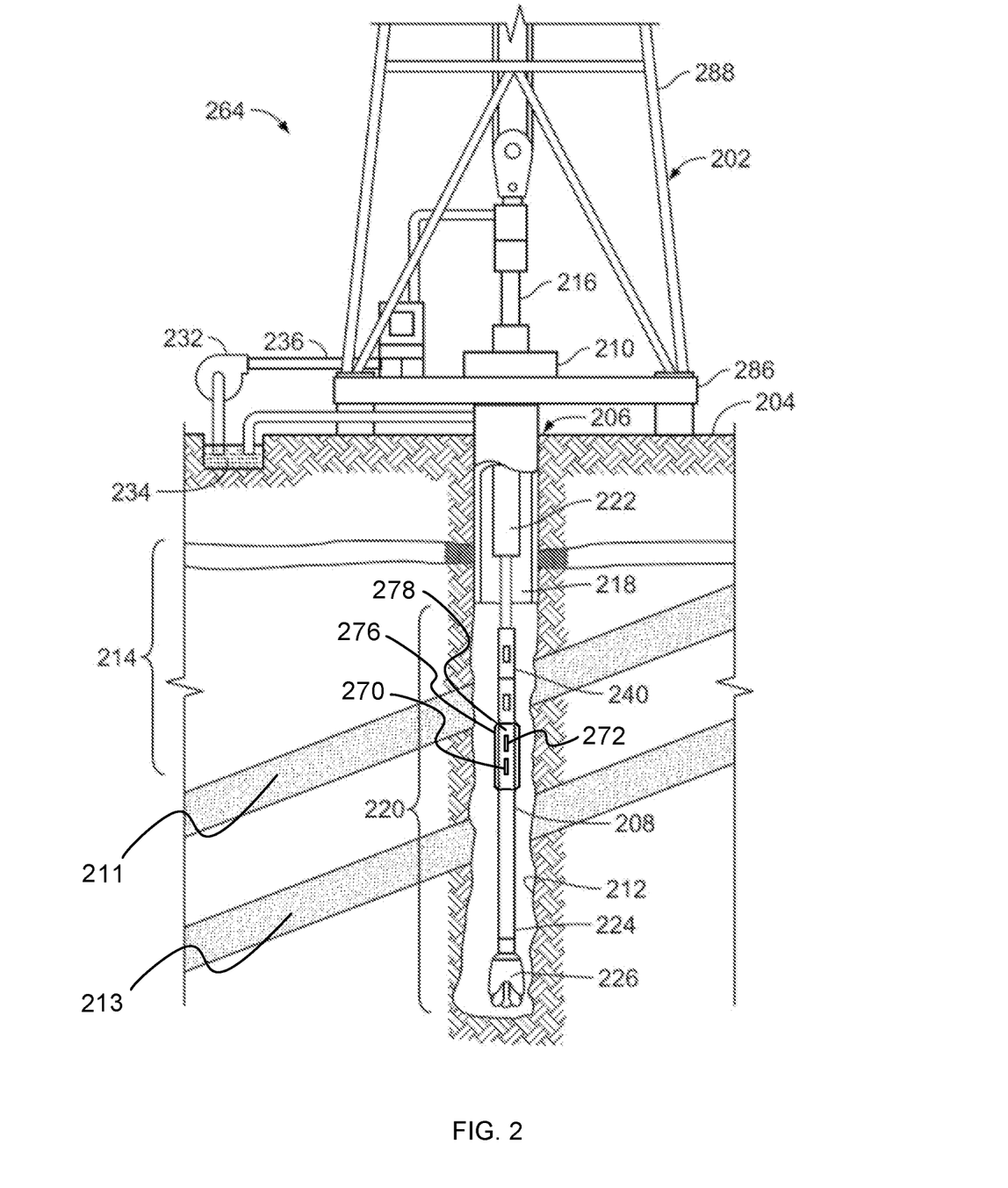
FIG. 2 is an example Logging While Drilling (LWD) system, according to some embodiments

In some embodiments, sensor measurements can be captured by a Measurement While Drilling (MWD) or Logging While Drilling (LWD) logging tool as part of a drilling system. An example of such a drilling system is now described. FIG. 2 depicts an example LWD system, according to some embodiments.

In FIG. 2 it can be seen how a system 264 can include a drilling rig 202 located at the surface 204 of a well 206. Drilling of oil and gas wells is commonly carried out using a string of drill pipes connected together so as to form a drilling string 208 that is lowered through a rotary table 210 into a wellbore or borehole 212. Here a drilling platform 286 is equipped with the derrick 202 that supports a hoist.

The drilling rig may thus provide support for the drill string 208. The drill string 208 may operate to penetrate the rotary table 210 for drilling the borehole 112 through subsurface formations 211, 213, 214. Subsurface formations can include layers of differing resistivities. The drill string 208 may include a Kelly 216, drill pipe 218, and a bottom hole assembly 220, perhaps located at the lower portion of the drill pipe 218.

The bottom hole assembly 220 may include drill collars 222, a down hole tool 224, and a drill bit 226. The drill bit 226 may operate to create the borehole 212 by penetrating the surface 204 and subsurface formations 211, 213, 214. The down hole tool 224 may comprise any of a number of different types of tools including MWD tools, LWD tools, and others. In some embodiments, the down hole tool 224 can be a logging tool 278 comprising of blades 276 and sensors 270, 272 such as microresistivity imaging sensors disposed on the drill string 208. Each of the sensors 270, 272 face radially outward towards the borehole 212 and provide resistivity measurements circumferentially around at least a portion of the borehole 212. The images may be used to determine the dip and direction of bedding planes intersected by the wellbore.

During drilling operations, the drill string 208 (perhaps including the Kelly 216, the drill pipe 218, and the bottom hole assembly 220) may be rotated by the rotary table 210. In addition to, or alternatively, the bottom hole assembly 220 may also be rotated by a motor (e.g., a mud motor) that is located down hole. The drill collars 222 may be used to add weight to the drill bit 226. The drill collars 222 may also operate to stiffen the bottom hole assembly 220, allowing the bottom hole assembly 220 to transfer the added weight to the drill bit 226, and in turn, to assist the drill bit 226 in penetrating the surface 204 and subsurface formations 211, 213, 214.

During drilling operations, a mud pump 232 may pump drilling fluid (sometimes known by those of ordinary skill in the art as "drilling mud") from a mud pit 234 through a hose 236 into the drill pipe 218 and down to the drill bit 226. The drilling fluid can flow out from the drill bit 226 and be returned to the surface 204 through an annular area 240 between the drill pipe 218 and the sides of the borehole 112. The drilling fluid may then be returned to the mud pit 234, where such fluid is filtered. In some embodiments, the drilling fluid can be used to cool the drill bit 226, as well as to provide lubrication for the drill bit 226 during drilling operations. Additionally, the drilling fluid may be used to remove subsurface formation 211, 213, 214 cuttings created by operating the drill bit 226. It is the images of these cuttings that many embodiments operate to acquire and process.

Dip Detection and Interpolation Examples

Figure 3:
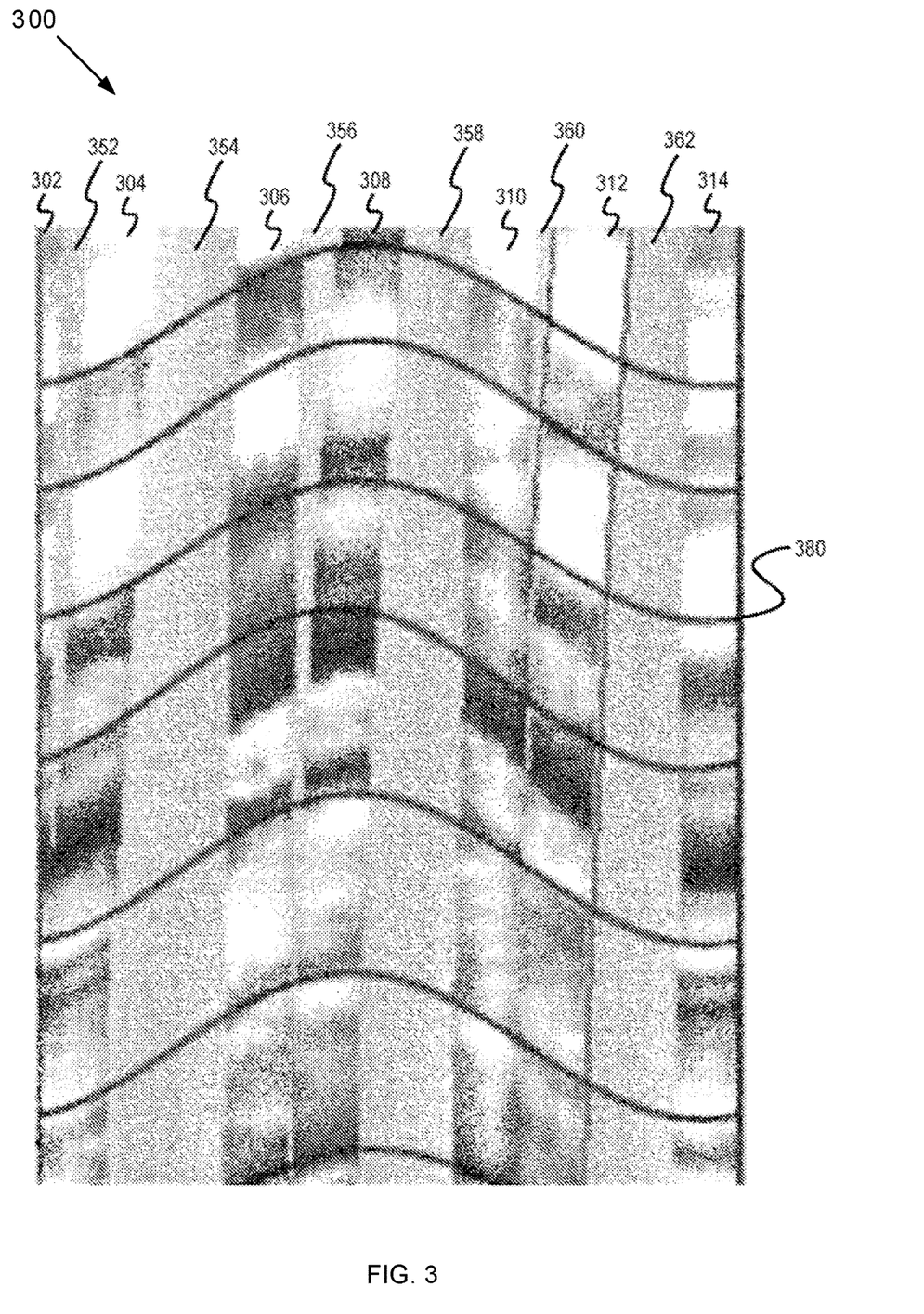
FIG. 3 is a partial logging image of a surrounding formation in a borehole that includes captured image portions separated by gaps, according to some embodiments.

FIG. 3 is a partial logging image of a surrounding formation in a borehole that includes captured image portions separated by gaps, according to some embodiments. In particular, with reference to FIG. 1, FIG. 3 depicts a partial image 300 that combines a number of captured resistivity image windows 302-314 of the borehole 114 obtained by sensors 126. The captured resistivity image windows 302-314 are separated by gaps 352-362 representing portions of the formation not captured by the sensors 126. Dips 380 represented by sinusoidal lines are obtained by the process of dip detection (described below) and overlaid on top of the partial image 300.

Figure 4:
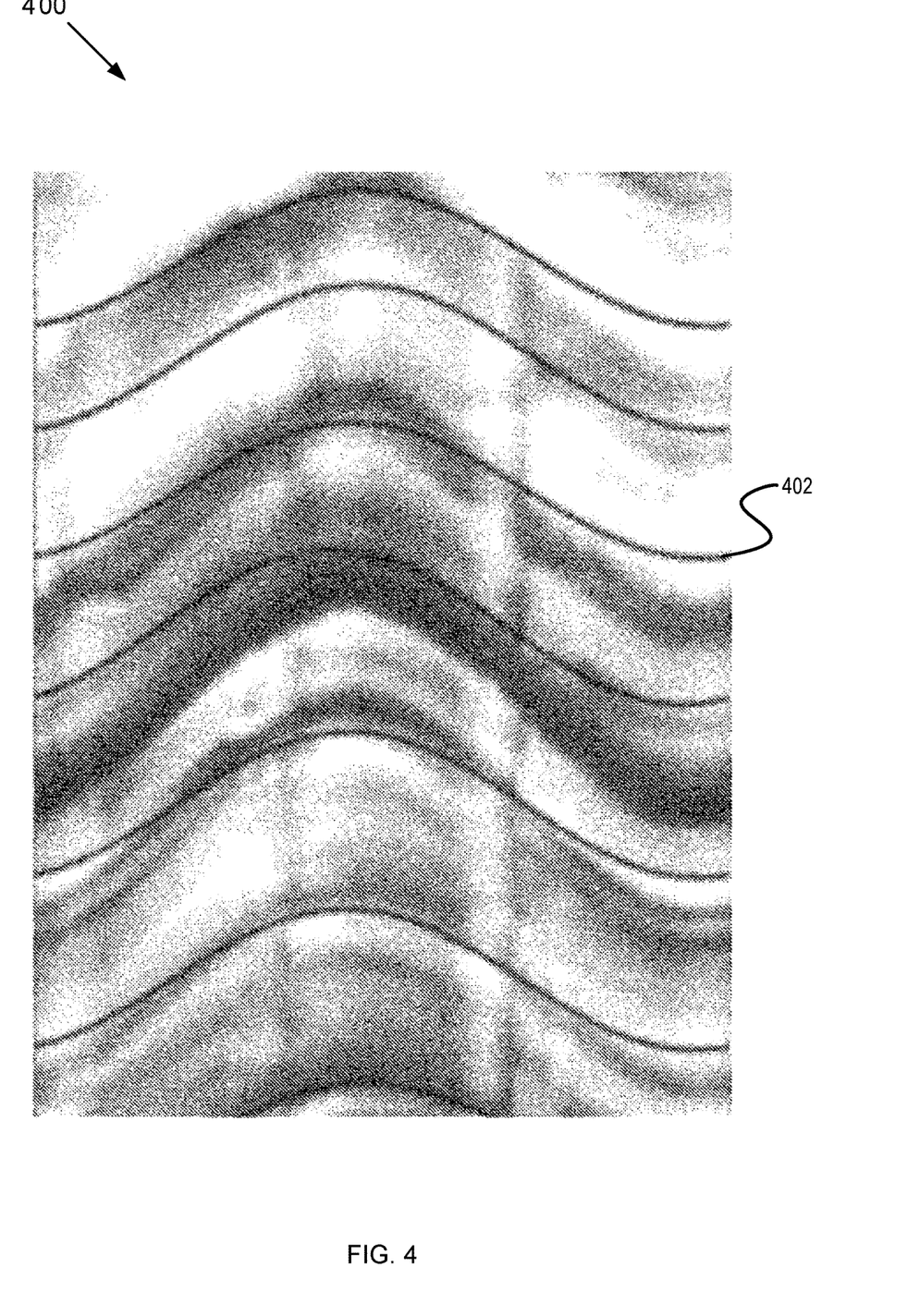
FIG. 4 is a full logging image of a surrounding formation in a borehole after interpolation based on dip detection has been applied to the partial logging image of FIG. 3, according to some embodiments.

FIG. 4 is a full logging image of a surrounding formation in a borehole after interpolation based on dip detection has been applied to the partial logging image of FIG. 3, according to some embodiments. In particular, with reference to FIG. 3, FIG. 4 depicts a full image 400 that represents the partial logging image 300 with the gaps 352-356 filled in by the process of interpolation. That is, the full image 400 no longer includes gaps—these have been filled with image data constructed based on interpolation of the partial image. The interpolation is based on dips 402 discovered during the process of dip detection. These dips 402 are represented by sinusoidal lines in the figure.

Figure 5:
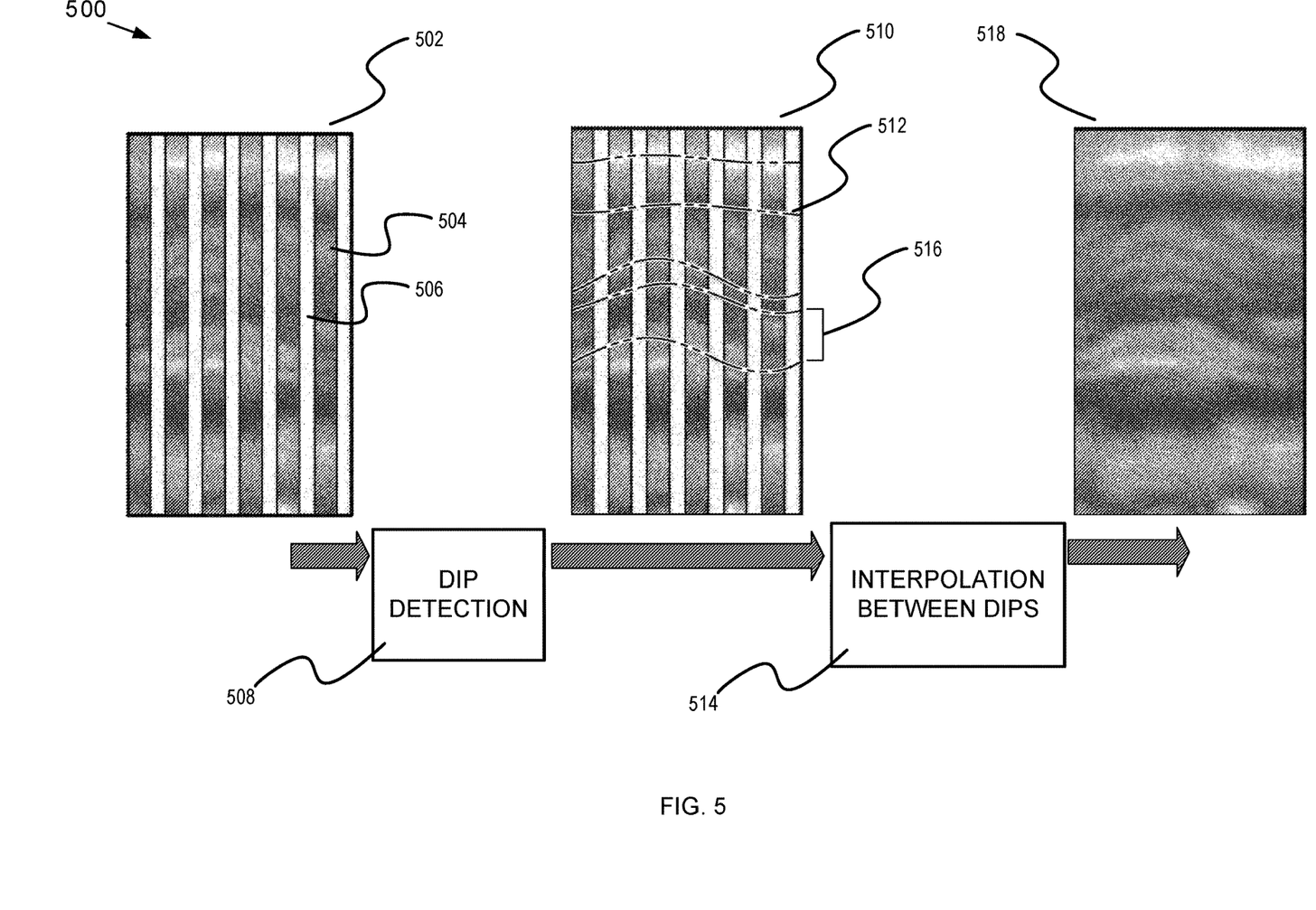
FIG. 5 is a process to transform a partial logging image into a full logging image, according to some embodiments.

FIG. 5 is a process to transform a partial logging image into a full logging image, according to some embodiments. The process includes dip discovery, and interpolation between the dips that have been discovered. In particular, FIG. 5 depicts a process 500 that includes dip detection and interpolation between dips. With reference to FIGS. 1-2, a raw borehole resistivity image 502 that is similar to partial image 200 and that comprises captured resistivity image windows 504 and gaps 506 is obtained by sensors 126. This raw image 502 is processed through dip detection 508. Dip detection 508 comprises identifying dips in the captured resistivity image windows 504 by filtering peaks that are likely to form dips, grouping those peaks together, and fitting a sinusoidal curve through the peak groups across all of the image. For example, dip detection may result in a dip-detected resistivity image 510 with dips 512 represented by sinusoidal curves that fit the features on the raw borehole resistivity image 502.

The dip-detected resistivity image 510 is further processed by interpolating between dips 514. Interpolation between dips 514 involves extracting a section 516 between adjacent dips, stretching the section 516 into rectangle by resampling vertical lines, interpolating the missing pixels in the rectangles, then squeezing the interpolated rectangles back into the same shape as the extracted section. For example, a full interpolated image 518 is obtained through interpolation between dips 514 of the dip-detected resistivity image 510. The full interpolated image 518 has gaps 506 filled in while maintaining continuity of the sections 516 between adjacent dips.

Figure 6:
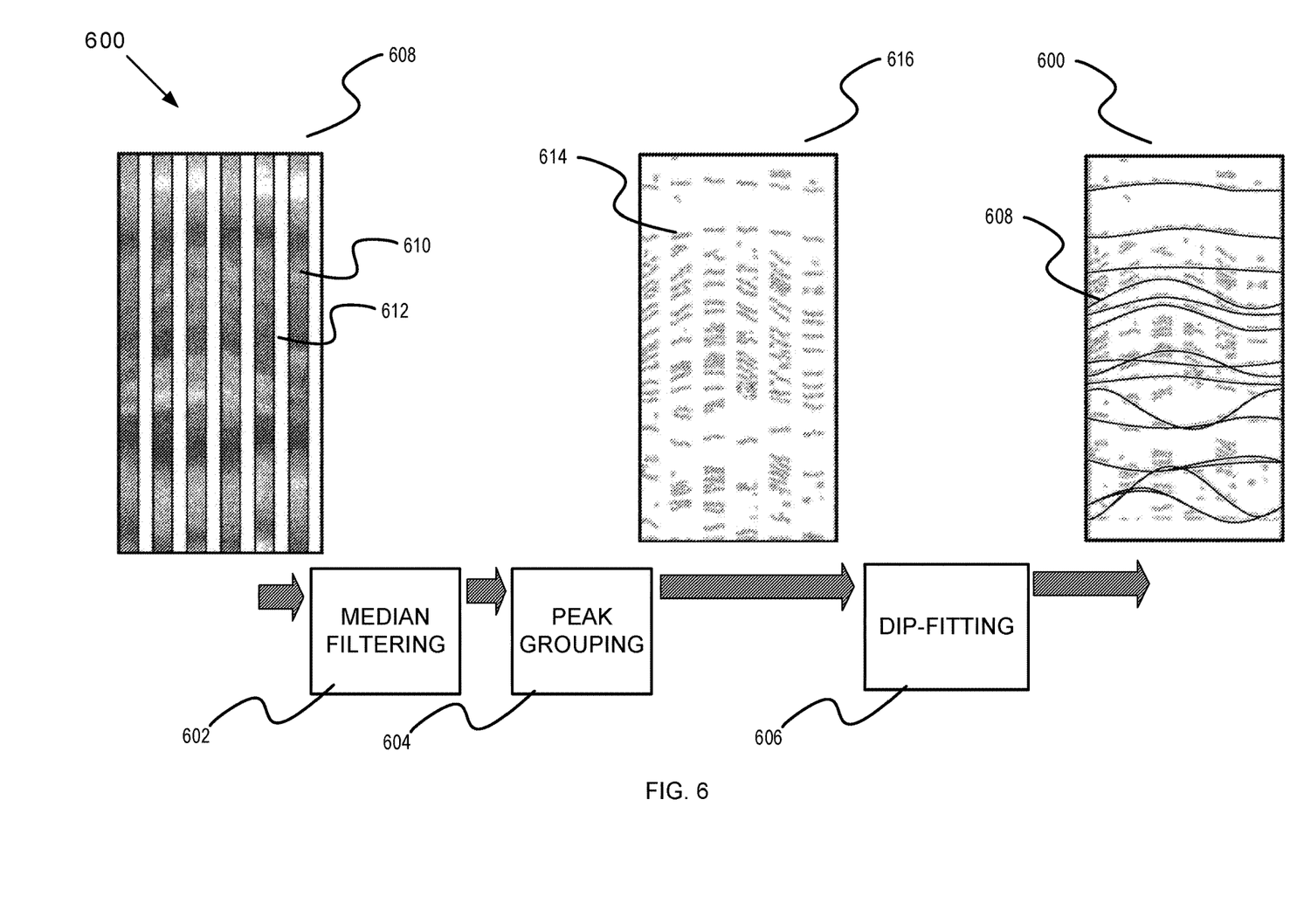
FIG. 6 is a process to detect dips in a partial logging image, according to some embodiments.

FIG. 6 is a process to detect dips in a partial logging image, according to some embodiments. A process 600 includes median filtering 602, peak grouping 604 and dip-fitting 606 which involves determining dips that provide a good fit to the peaks. With reference to FIGS. 1 and 5, a raw borehole resistivity image 608 is shown, that corresponds to partial image 502, comprising captured resistivity image windows 610 and gaps 612 that have been obtained by sensors 126. In order to discover the dips, the features of the captured resistivity image windows 610 that make up the dips in each sensor are processed using median filtering 602.

Median filtering is a digital filtering technique based on the observation that bed boundaries, such as dips, are most visible where the image contrast is highest, which in some embodiments means that the pixel value difference is the greatest. An original differential line generated by contrasting the pixels along the depth. The differential line is then used to generate a median line by taking a window of the sample and assigning the median value to a new median line instead. The regions in which the difference between the original differential line and median line would be the greatest are most often the peak sections.

Figure 7:
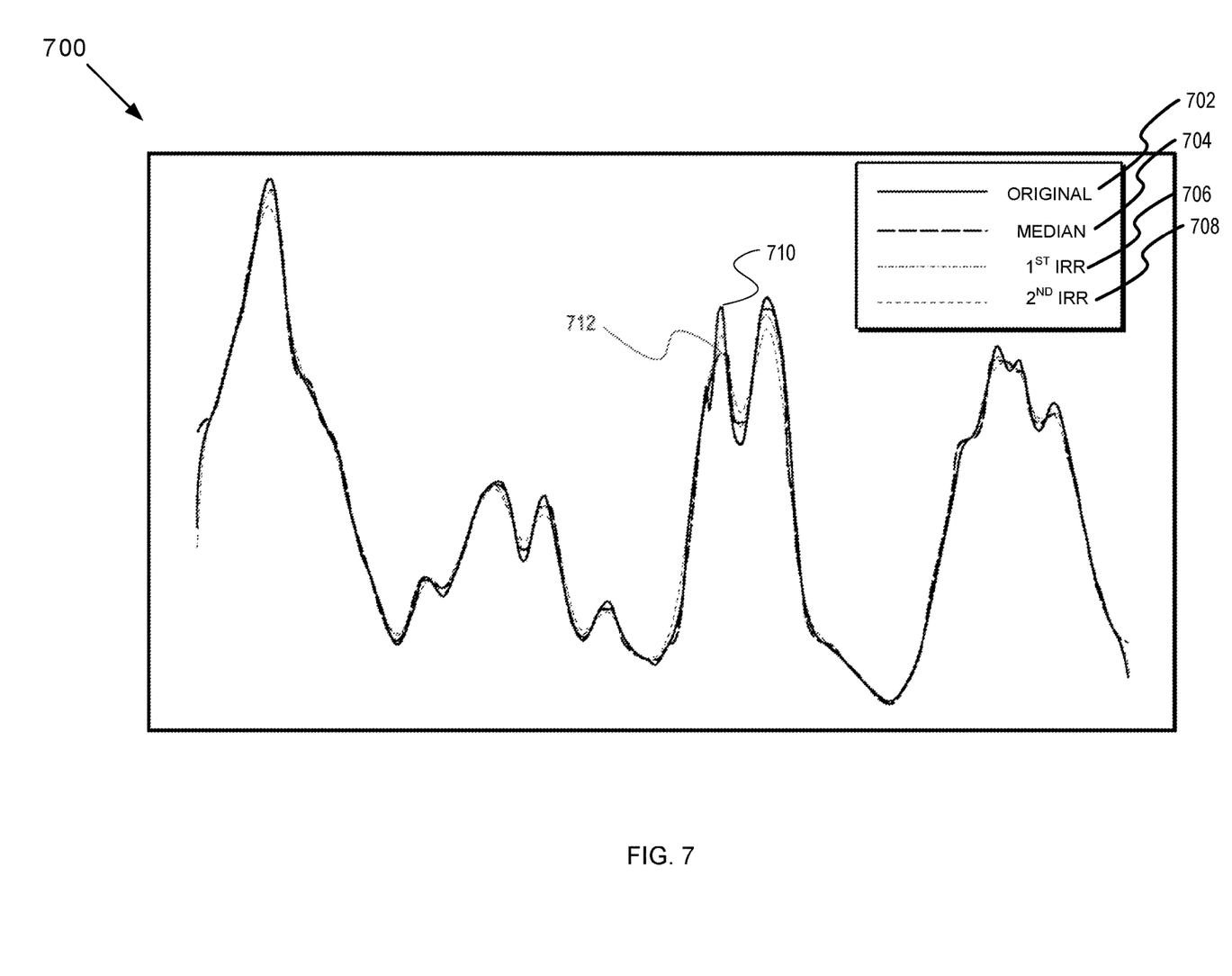
FIG. 7 is a graph that includes a median filtering to remove peak sections, according to some embodiments.

To illustrate this process, FIG. 7 depicts a graph that includes median filtering to remove peak sections, according to some embodiments. In particular, FIG. 7 depicts a graph 700 that contains an original differential line 702, a median line 704, first and second infinite impulse response (IIR) lines 706 and 708. The original line 702 contain peaks 710 whereas the median line 704 has those peaks cut off into suppressed peaks 712. By subtracting the median line 704 from the differential line 702, peak sections can be isolated and thus be located.

Referring back to FIG. 6, once the peak sections are identified through median filtering 602, the peaks are further processed through peak grouping 604 where connected peak sections across the raw borehole resistivity image 608 may be joined into distinct connected peak areas 614 to form a peak area image 616. This can be done by sequentially assigning a number for each pixel in peak sections. For each pair of adjacent pixels, the pixel with larger number can be reassigned by the smaller number and this reassignment process can be repeated until no changes are available. Thus, pixels with same number will belong to the same distinct connected peak area 614. To implement this process, the raw borehole resistivity image 608 can be kept in matrix form, with the reassigning process executed simultaneously at the full matrix level by shifting the matrix up, down, left, right, and diagonally. In some embodiments, the block-reassignment process is repeated only until every pixel has settled upon a sequentially assigned number.

After peak sections are grouped together to generate the peak areas image 616 by peak grouping 604, the image 616 is then processed through dip-fitting 606. In dip-fitting 606, a sliding window along the depth axis may be used to limit the number of peak area combinations available to determine a fitted sinusoid dips 608. The length of the window may be around twice the maximum dip amplitude. In each of the captured resistivity image windows 610 there may be four or five peak areas inside the window. One peak area associated with each sensor that can be selected to form a group of six peak areas across the image. Fitted sinusoid dips 608 can be determined over the group of peak areas using linear least-squares fitting. Accordingly, if there are five peak areas in each sensor, the number of potential dips would be $5^6$. Those potential dips can be sorted and ranked basing on a fitting distance error, a smoothness of image along the dip, a dip frequency deviation (perhaps as little as one cycle per image width), etc. to determine the fitted sinusoid dips 608.

An alternative approach to reduce the number of dips for ranking can be to combine peak areas in only three captured resistivity image windows 610 (i.e. 1, 3, 5 or 2, 4, 6). The number of dips would then drop significantly: from $5^6$ to $5^3$. Once a dip is computed for three sensors, a dip can be ranked according to how well it fits peak areas in the other three sensors.

Figure 8:
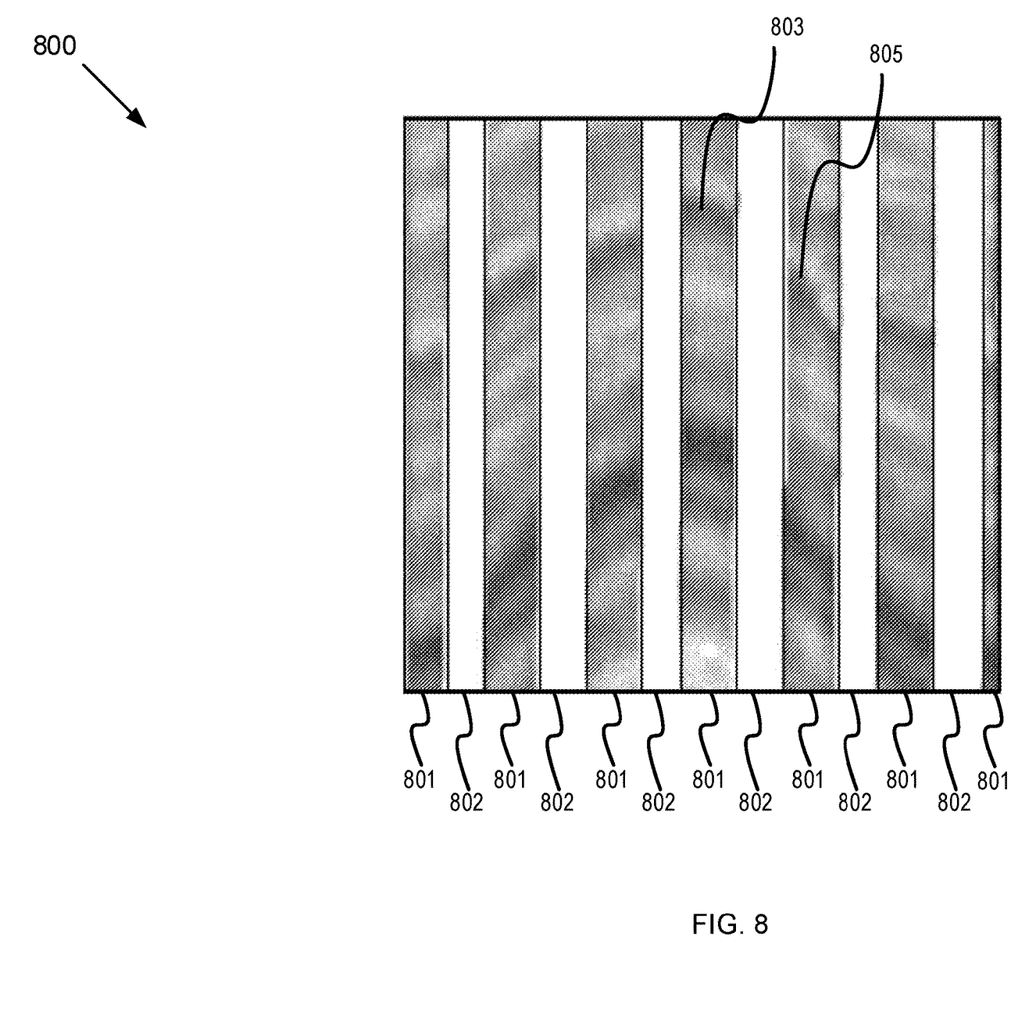
FIG. 8 is an example logging image produced by pad misalignment, according to some embodiments.

FIG. 8 is an example logging image produced by pad misalignment, according to some embodiments. In particular, FIG. 8 with reference to FIG. 1, depicts an image 800 comprising captured resistivity image windows 801 and gaps 802 obtained by sensors 126 that illustrates pad 127 misalignment. With the alternative approach that reduces the number of dips used for ranking, misalignment can be accommodated between odd and even groups of captured resistivity image windows 801.

With reference to FIG. 1, when the captured resistivity image windows 801 are constructed, the depth of individual sensor 126 that capture resistivity values used to construct the image windows 801 may be misaligned; this misalignment in turn creates corresponding misalignment between the dip features 803 and 805. This misalignment of the image windows 801 can be due to the structure of the tool itself, where captured resistivity image windows 801 are assembled according to their acquisition using upper and lower sets of three sensors. Thus, in some embodiments that use linear least-squares equation to fit dips, a misalignment coefficient can be incorporated into the least-squares equation so that the dip can fit into peak areas of the image associated with each group of pads—with the knowledge that there is maybe a gap between two groups. By solving the linear least-squares equation, the misalignment coefficient is computed together with dip coefficients. This process not only allows handling images with pad misalignment, but also allows estimating the amount of misalignment and correcting the image accordingly. This process enables the missing pixels to be filled in with values that preserve the continuity of the discovered dip features.

Figure 9:
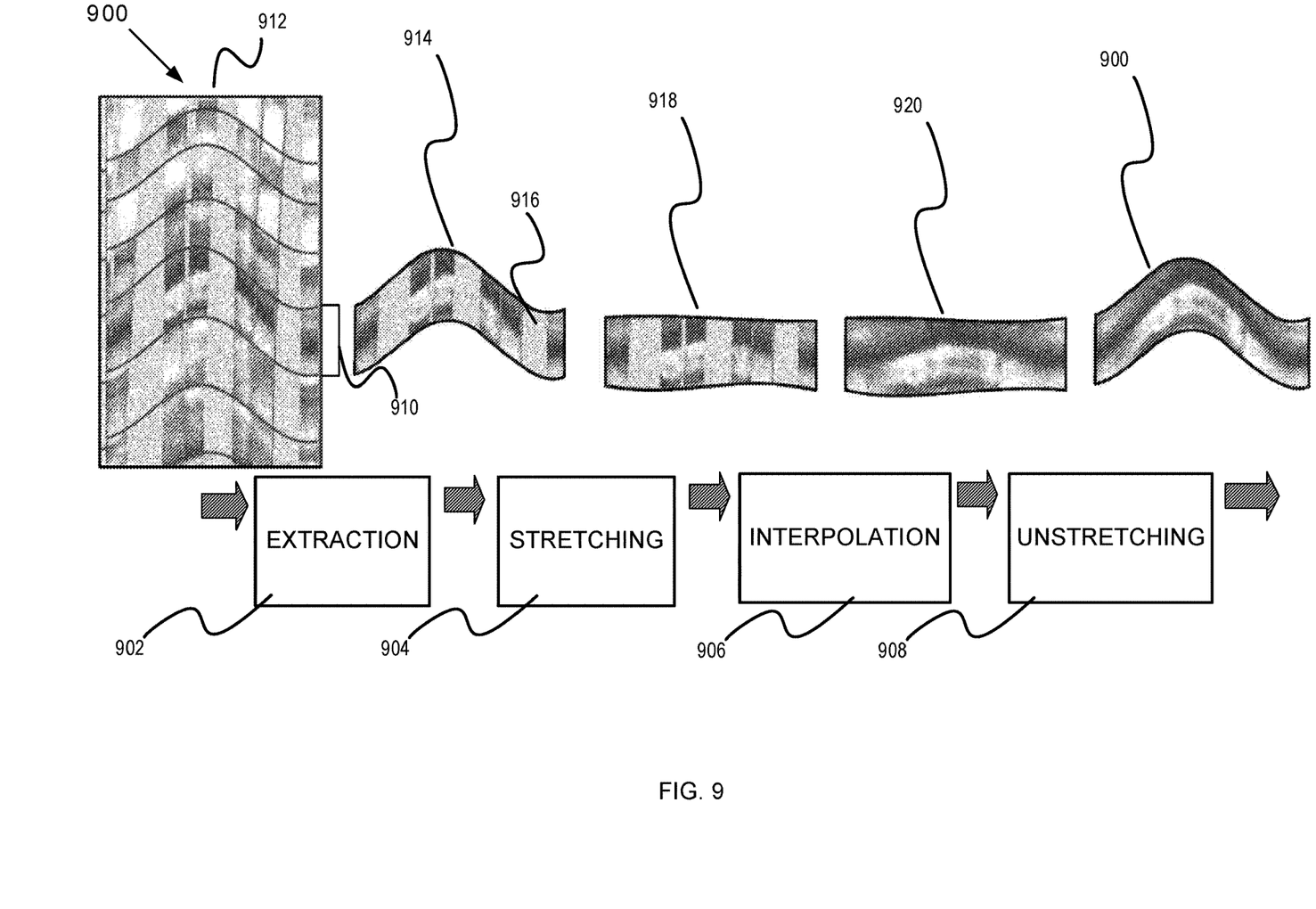
FIG. 9 is a process of interpolation between dips in a partial logging image, according to some embodiments.

FIG. 9 is a process of interpolation between dips in a partial logging image, according to some embodiments. A process 900 comprises extraction 902, stretching 904, interpolation 906, and unstretching 908. The first act in the process 900 is extraction 902, where a section between two adjacent dips 910 is extracted from the dip-detected resistivity image 912. The extracted section 914 include gaps 916 that have missing pixels. The extracted sections 914 undergoes stretching 904 by up-sampling the vertical line at a higher rate common across the image to form a rectangular section 918. Once the extracted section 914 is stretched into a rectangular region 918, a two-dimensional (2D) linear interpolation can be applied to fill in the gaps 916 to form an interpolated section 920. In some embodiments texture extraction or various interpolation techniques can be used to fill in the gaps 916 with images to more accurately represent the resistivity measurements obtained from the formation downhole. Lastly, the interpolated section 920 undergoes unstretching 908 by vertically down-sampling the image, transforming the interpolated section 920 back to the original size of the extracted section 914 between dips. A full interpolated image (as is shown in FIG. 4) is produced as the result of repeating this process from dip to dip along the depth axis.

Example Computer

Figure 10:
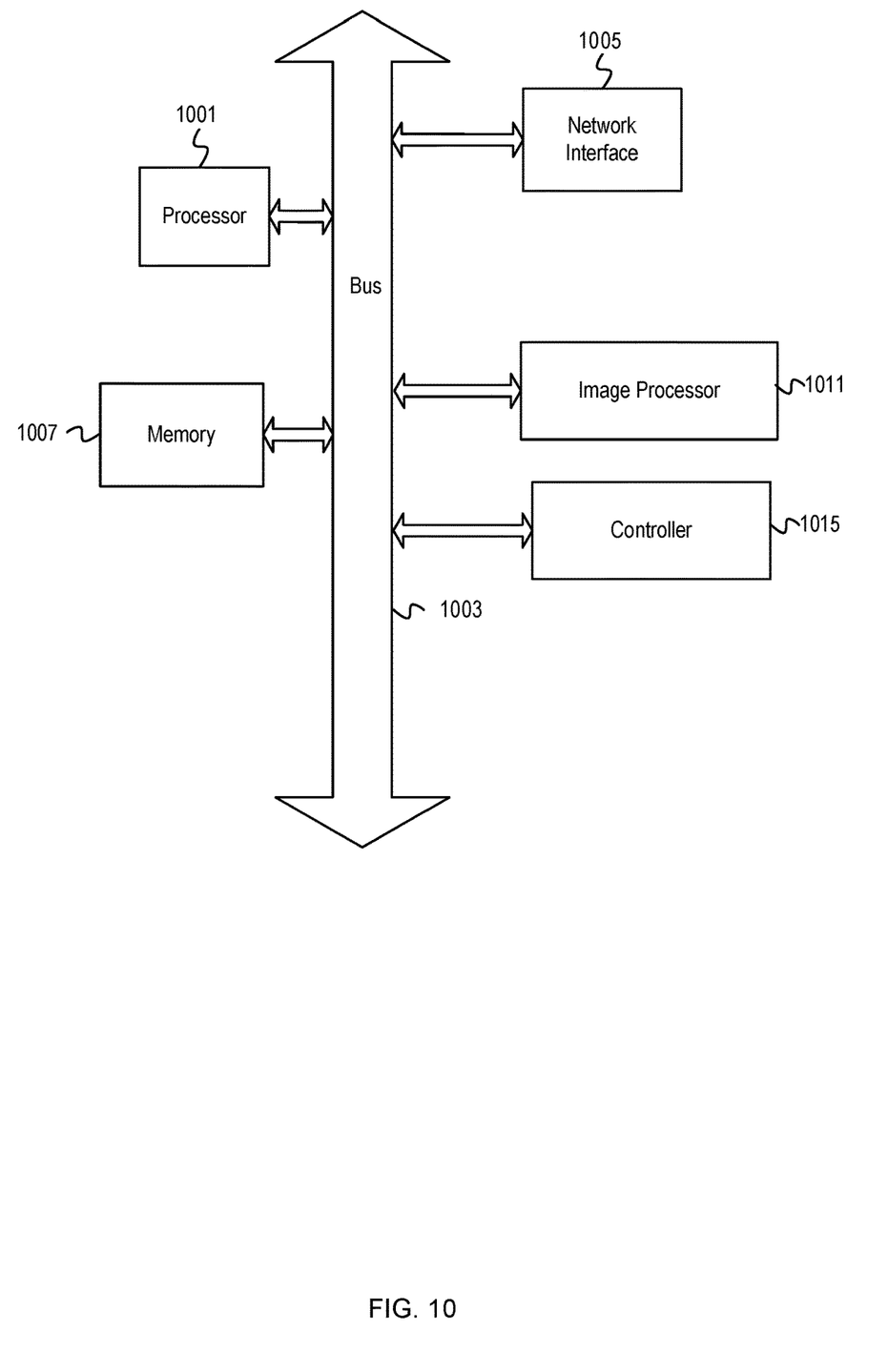
FIG. 10 is an example computer, according to some embodiments.

FIG. 10 depicts an example computer, according to some embodiments. The computer includes a processor 1001 (possibly including multiple processors, multiple cores, multiple nodes, and/or implementing multi-threading, etc.). The computer includes memory 1007. The memory 1007 may be system memory (e.g., one or more of cache, static random access memory (SRAM), dynamic random access memory (DRAM), zero capacitor random access memory (RAM), Twin Transistor RAM, enhanced dynamic random access memory (eDRAM), extended data output (EDO) RAM, double data rate (DDR) RAM, electrically erasable programmable read-only memory (EEPROM), nano-random access memory (NRAM), resistive random access memory (RRAM), silicon-oxide-nitride-oxide-silicon (SONOS), parameter random access memory (PRAM), etc.) or any one or more of the above already described possible realizations of machine-readable media. The computer system also includes a bus 1003 (e.g., peripheral component interconnect (PCI), industry standard architecture (ISA), PCI-Express, HyperTransport® bus, InfiniBand® bus, NuBus, etc.) and a network interface 1005 (e.g., a Fiber Channel interface, an Ethernet interface, an internet small computer system interface, synchronous optical networking (SONET) interface, wireless interface, etc.).

The computer also includes an image processor 1011 and a controller 1015. The image processor 1011 can perform dip detection and interpolation of partial logging images with gaps, as described above. The controller 1015 can control the different operations that can occur in the response to the image. For example, the controller 1015 can communicate instructions to the appropriate equipment, devices, etc. to alter the drilling operations. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus for execution to implement the various methods described above.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a RAM, a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to more efficiently evaluate the formation and its features.

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1

A method for imaging a downhole formation, the method comprising: combining captured images to generate a partial image of a formation, wherein the partial image includes the captured images acquired from at least one sensor disposed on a tool within the formation, the captured images separated by gaps representing portions of the formation not captured by the at least one sensor; locating dips in the formation within the partial image, to provide located dips; and interpolating the partial image, using the located dips within the partial image, to construct image data for the gaps of the partial image to create a full interpolated image of the formation.

Embodiment 2

The method of Embodiment 1, wherein interpolating the partial image comprises using texture extraction techniques.

Embodiment 3

The method of any one of Embodiments 1-2, wherein locating dips in the formation within the partial image comprises using median filtering to identify peak sections.

Embodiment 4

The method of any one of Embodiments 1-3, wherein locating dips in the formation within the partial image comprises: dip-fitting peak sections across the captured images by using linear least-squares fitting to define potential dips; and ranking the potential dips based on any one or combination of fitting distance error, smoothness of the dips, and dip frequency deviation.

Embodiment 5

The method of any one of Embodiments 1-4, wherein locating dips in the formation within the partial image comprises incorporating a misalignment coefficient.

Embodiment 6

The method of Embodiment 1, wherein locating dips in the formation within the partial image comprises identifying peak sections in the combined image based on a differential of each vertical line and portions of the combined image along a depth.

Embodiment 7

The method of any one of Embodiments 1 and 6, wherein locating dips in the formation within the partial image comprises combining peak sections that are connected to form a peak area for each portion of the combined image detected by the at least one sensor.

Embodiment 8

The method of any one of Embodiments 1 and 6-7, wherein locating dips in the formation within the partial image comprises performing a dip-fitting over a peak area using a sliding window along a depth axis to locate the dip.

Embodiment 9

A system for determining a dip of a formation, the system comprising: a logging tool to be positioned in a borehole within the formation, the logging tool comprising at least one sensor disposed on one or more pads, wherein the at least one sensor is to detect signals representing portions of captured images of the formation; a processor; and a machine-readable medium having program code executable by the processor to cause the processor to, generate a combined image of the formation that includes combining the captured images; and detect a dip in the formation within the combined image, the detecting comprising, determine a differential of vertical lines and portions of the combined image along a depth; identify peak sections in the combined image based on the differential of each vertical line; combine the peak sections that are connected to form a peak area for each portion of the combined image detected by the at least one sensor; and perform a dip-fitting over the peak area using a sliding window along a depth axis to locate the dip.

Embodiment 10

The system of Embodiment 9, wherein identifying the peak sections in the combined image comprises of median filtering to identify the peak sections.

Embodiment 11

The system of any one of Embodiments 9-10, wherein performing the dip-fitting over the peak area comprises of: dip-fitting the peak area across the captured images by using linear least-squares fitting; and ranking potential dips based on fitting distance error, smoothness of the dips, or dip frequency deviation.

Embodiment 12

The system of Embodiment 11, wherein total number of potential dips that are ranked are reduced by decreasing a number of peak areas used in the linear least-squares fitting.

Embodiment 13

The system of any one of Embodiments 9-12, wherein performing the dip-fitting over the peak area comprises of incorporating a misalignment coefficient.

Embodiment 14

One or more non-transitory machine-readable media comprising instructions executable by a processor to cause the processor to: combine captured images to generate a partial image of a formation, wherein the partial image includes the captured images acquired from at least one sensor disposed on a tool within the formation, the captured images separated by gaps representing portions of the formation not captured by the at least one sensor; locate dips in the formation within the partial image, to provide located dips; and interpolate the partial image, using the located dips within the partial image, to construct image data for the gaps of the partial image to create a full interpolated image of the formation.

Embodiment 15

The one or more non-transitory machine-readable media of Embodiment 14, wherein interpolating the partial image comprises of using texture extraction techniques.

Embodiment 16

The one or more non-transitory machine-readable media of any one of Embodiments 14-15, wherein locating dips in the formation within the partial image comprises of median filtering to identify peak sections.

Embodiment 17

The one or more non-transitory machine-readable media of any one of Embodiments 14-16, wherein locating dips in the formation within the partial image comprises of: dip-fitting peak sections across the captured images by using linear least-squares fitting; and ranking potential dips based on fitting distance error, smoothness of the dips, or dip frequency deviation.

Embodiment 18

The one or more non-transitory machine-readable media of any one of Embodiments 14-17, wherein locating dips in the formation within the partial image comprises of incorporating a misalignment coefficient.

Embodiment 19

The one or more non-transitory machine-readable media of Embodiment 14, wherein locating dips in the formation within the partial image comprises identifying peak sections in the combined image based on a differential of each vertical line and portions of the combined image along a depth.

Embodiment 20

The one or more non-transitory machine-readable media of any one of Embodiments 14 and 19, wherein locating dips in the formation within the partial image comprises combining peak sections that are connected to form a peak area for each portion of the combined image detected by the at least one sensor.

What is claimed is:

1. A method for imaging a downhole formation, the method comprising:
    combining captured images to generate a partial image of a formation, wherein the partial image includes the captured images acquired from at least one sensor disposed on a tool within the formation, the captured images separated by gaps representing portions of the formation not captured by the at least one sensor;
    locating dips in the formation within the partial image, to provide located dips, wherein locating dips in the formation within the partial image comprises identifying peak sections in the partial image based on a differential of each vertical line and portions of the partial image along a depth; and
    interpolating the partial image, using the located dips within the partial image, to construct image data for the gaps of the partial image to create a full interpolated image of the formation.

2. The method of claim 1, wherein interpolating the partial image comprises using texture extraction techniques.

3. The method of claim 1, wherein locating dips in the formation within the partial image comprises using median filtering to identify the peak sections.

4. The method of claim 1, wherein locating dips in the formation within the partial image comprises:
  dip-fitting peak sections across the captured images by using linear least-squares fitting to define potential dips; and
  ranking the potential dips based on any one or combination of fitting distance error, smoothness of the dips, and dip frequency deviation.

5. The method of claim 1, wherein locating dips in the formation within the partial image comprises incorporating a misalignment coefficient.

6. The method of claim 1, wherein locating dips in the formation within the partial image comprises combining peak sections that are connected to form a peak area for each portion of the partial image detected by the at least one sensor.

7. The method of claim 1, wherein locating dips in the formation within the partial image comprises performing a dip-fitting over a peak area using a sliding window along a depth axis to locate the dip.

8. A system for determining a dip of a formation, the system comprising:
  a logging tool to be positioned in a borehole within the formation, the logging tool comprising
    at least one sensor disposed on one or more pads, wherein the at least one sensor is to detect signals representing portions of captured images of the formation;
  a processor; and
  a machine-readable medium having program code executable by the processor to cause the processor to,
  generate a combined image of the formation that includes the captured images; and
  detect a dip in the formation within the combined image, wherein the program code to detect the dip also includes program code to cause the processor to,
    determine a differential of vertical lines and portions of the combined image along a depth;
    identify peak sections in the combined image based on the differential of each vertical line;
    combine the peak sections that are connected to form a peak area for each portion of the combined image detected by the at least one sensor; and
    perform a dip-fitting over the peak area using a sliding window along a depth axis to locate the dip.

9. The system of claim 8, wherein the program code to identify the peak sections in the combined image comprises program code to cause the processor to apply median filtering to identify the peak sections.

10. The system of claim 8, wherein the program code to perform the dip-fitting over the peak area comprises program code to cause the processor to:
  dip-fit the peak area across the captured images by using linear least-squares fitting; and
  rank potential dips based on fitting distance error, smoothness of the dips, or dip frequency deviation.

11. The system of claim 10, wherein a total number of the potential dips that are ranked is reduced by decreasing the number of peak areas used in the linear least-squares fitting.

12. The system of claim 8, wherein the program code to perform the dip-fitting over the peak area comprises program code to cause the processor to incorporate a misalignment coefficient.

13. One or more non-transitory machine-readable media comprising instructions executable by a processor to cause the processor to:
  combine captured images to generate a partial image of a formation, wherein the partial image includes the captured images acquired from at least one sensor disposed on a tool within the formation, the captured images separated by gaps representing portions of the formation not captured by the at least one sensor;
  locate dips in the formation within the partial image, to provide located dips, wherein the location of dips in the formation within the partial image comprises an identification of peak sections in the partial image based on a differential of each vertical line and portions of the partial image along a depth; and
  interpolate the partial image, using the located dips within the partial image, to construct image data for the gaps of the partial image to create a full interpolated image of the formation.

14. The one or more non-transitory machine-readable media of claim 13, wherein the program code to interpolate the partial image comprises program code to cause the processor to use texture extraction techniques.

15. The one or more non-transitory machine-readable media of claim 13, wherein the location of dips in the formation within the partial image comprises of median filtering to identify the peak sections.

16. The one or more non-transitory machine-readable media of claim 13, wherein the program code to locate dips in the formation within the partial image comprises program code to cause the processor to:
  dip-fit peak sections across the captured images by using linear least-squares fitting; and
  rank potential dips based on fitting distance error, smoothness of the dips, or dip frequency deviation.

17. The one or more non-transitory machine-readable media of claim 13, wherein the program code to locate dips in the formation within the partial image comprises program code to cause the processor to incorporate a misalignment coefficient.

18. The one or more non-transitory machine-readable media of claim 13, wherein the program code to locate dips in the formation within the partial image comprises program code to cause the processor to combine peak sections that are connected to form a peak area for each portion of the partial image detected by the at least one sensor.

19. The method of claim 4, wherein dip-fitting peak sections across the captured images comprises fitting a sinusoidal curve through the peak sections across the captured images.

20. The one or more non-transitory, machine-readable media of claim 16, wherein the program code to dip-fit peak sections across the captured images comprises program code to cause the processor to fit a sinusoidal curve through the peak sections across the captured images.

* * * * *